US006651178B1

(12) United States Patent
Voegeli et al.

(10) Patent No.: US 6,651,178 B1
(45) Date of Patent: *Nov. 18, 2003

(54) COMMUNICATION MODULE HAVING POWER SUPPLY REQUIREMENT IDENTIFICATION

(75) Inventors: Derick Voegeli, Crystal Lake, IL (US); Michael Cranston, Streamwood, IL (US); Gregory Glasshof, Palatine, IL (US); Scot Salzman, Buffalo Grove, IL (US); Roger Shuma, Aurora, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/515,562

(22) Filed: Feb. 29, 2000

(51) Int. Cl.$^7$ ................................................. G06F 1/26
(52) U.S. Cl. ........................................... 713/300; 713/1
(58) Field of Search ................................ 713/300, 310, 713/330, 340, 1, 2

(56) References Cited

U.S. PATENT DOCUMENTS

| | | | |
|---|---|---|---|
| 5,079,410 A | | 1/1992 | Payne et al. ................. 219/506 |
| 5,103,110 A | | 4/1992 | Housworth et al. ........... 307/73 |
| 5,905,370 A | | 5/1999 | Bryson ........................ 323/283 |
| 5,928,365 A | * | 7/1999 | Yoshida ....................... 713/324 |
| 5,958,056 A | * | 9/1999 | Lehmann ..................... 713/310 |
| 6,137,188 A | | 10/2000 | Mitchell et al. ............... 307/29 |
| 6,149,319 A | * | 11/2000 | Richter et al. ............... 713/300 |
| 6,327,663 B2 | * | 12/2001 | Isaac et al. .................. 713/300 |
| 6,396,169 B1 | * | 5/2002 | Voegeli et al. ................ 307/52 |
| 6,448,672 B1 | * | 9/2002 | Voegeli et al. ................ 307/52 |
| 6,459,175 B1 | * | 10/2002 | Potega ........................ 307/149 |

OTHER PUBLICATIONS

Cherry Semiconductor, "5 Bit Synchronous CPU Controller With Power–Good And Current Limit", CS–5166, Jul. 30, 1998, pp. 1–23.

Linear Technology, "5–Bit Programmable Synchronous Switching Regulator Controller For Pentium® II Processor", LTC 1753, Sep. 1998, pp. 1–24.

Unitrode, "Average Current Mode Synchronous Controller With 5–Bit DAC", UCC2882/–1, Nov. 1998, pp. 1–13.

Linear Technology, "5–Bit Programmable Synchronous Switching Regulator Controller For Pentium® II Processor", LTC 1553, 1994, pp. 1–24.

VRM 8.3 DC–DC Converter Design Guidelines, Intel®, Mar. 1999, Order No. 243870–002, pp. 1–14.

Pentium Processor® with MMX™ Technology, Chapter 9.0 Electrical Specifications, Intel®, 1997, pp. 21–36.

Embedded Pentium® Processor Family Developer's Manual, Chapter 18.0 Hardware Interface, Intel®, 1998, pp. 18–1 to 18–65.

* cited by examiner

Primary Examiner—Dennis M. Butler
(74) Attorney, Agent, or Firm—McDonnell Boehnen; Hulbert & Berghoff

(57) ABSTRACT

A system and method for developing a cost efficient electronic power supply system that handles a range of supported electronic circuits is provided. The electronic power supply system adaptively configures the power applied to electronic circuits. Thereby, eliminating redesign of a power supply system when a newly developed or different electronic circuit is implemented. When an electronic circuit is attached to the electronic power supply, a controller confirms electronic circuit presence and queries for electronic circuit power on requirements. As more electronic circuits are added, the controller examines each electronic circuit power on requirements and determines if a power conflict is present. If a conflict exists, the controller will not supply power to the electronic circuits until the conflict is resolved. If a conflict does not exist, the controller powers up the present electronic circuits according to desired power on requirements by broadcasting commands to power supplies, some of which are programmable.

20 Claims, 7 Drawing Sheets

COMMUNICATION MODULE HAVING POWER SUPPLY REQUIREMENT IDENTIFICATION

FIELD OF THE INVENTION

This invention relates generally to a configurable and adaptable power supply for electronic systems requiring multiple voltages and, more particularly, relates to devices and methods for powering one or more circuits requiring multiple voltages.

BACKGROUND OF INVENTION

There exist adjustable controllers for use in power supplies, particularly in the field of microprocessors and digital signal processors (DSPs). Companies including Linear Technology, Unitrode, Power Trends, and Cherry Semiconductor provide controllers which, together with other components, act as a programmable power supply that can adapt to changing microprocessor voltage requirements. The controller is typically a dc-dc converter that often includes a digital to analog converter (DAC). The DAC accepts a voltage identifier (VID), typically a 5-bit digital word, from the microprocessor, and adjusts the output voltage in accordance with the 5-bit word. Thus, the microprocessor, such as Intel's Pentium processor, uses a VID to request an optimum voltage from the controller.

Many electronic systems, however, consist of more than one component, circuit or subsystem that may have changing power requirements. Furthermore, one or all components may demand multiple voltages. The system and methods set forth herein effectively and safely manage the power needs of an entire electronic system consisting of multiple circuit loads. It accomplishes this by using multiple programmable power supplies.

SUMMARY OF THE INVENTION

Modem electronic systems have a need for a power supply system made up of multiple voltages. These power supplies provide power to a variety of different components within the electronic system. From time to time, various components of the electronic systems may be redesigned, which may result in a change in that component's power supply requirements. When this happens, the power supply system must be redesigned to accommodate the new power requirements. The system and methods described herein are designed to provide a cost efficient electronic power supply system that is flexible enough to handle a range of supported electronic circuit loads without requiring redesign of the power supply system. The electronic power supply system adaptively configures the power applied to electronic circuit loads, thereby eliminating redesign of the power supply system when a newly developed or different electronic circuits are implemented.

The electronic power supply system preferably includes a power system controller, multiple programmable power supplies, a power bus for distributing power to the electronic circuits, a power control bus, a communication bus, and a plurality of electronic circuit loads. The power supply system applies power to the power bus via the power supplies when each of the electronic circuit loads have compatible power requirements. The electronic circuit loads provide the power system controller with the electronic circuit load power requirements via a communication bus. The power system controller sends commands to the power supplies over the power control bus.

The power system controller manages the electronic power supply system. Management of the electronic power supply system includes methods to ensure the electronic circuits operate in a safe and proper fashion, such as electronic circuit presence detection, electronic circuit identification, power sequencing and power ramping, conflict resolution and reset control. Preferably, the electronic circuit loads are modularized in the form of a circuit board or surface-mounted module, plug in module, etc. The module includes a module connection interface, which can take one of many well-known forms suitable to connect a circuit card to a baseboard or mother board. These are all referred to herein as modules, where each module typically has more than one voltage requirement.

Main power to the electronic power supply system preferably comes from a relatively constant voltage source. Power is initially supplied to the power system controller, module detecting circuit, module identification register, and power supplies. The power system controller communicates with each module via a communication bus. Circuit identification may be used to determine power requirements, or may be bypassed in the event that specific power requirement parameters are obtained directly from each electronic circuit or module.

Desired power requirements may include one or more of the following: voltage control parameters, turn-on sequencing control parameters, voltage delta control parameters, and time delta control parameters. The voltage control parameter indicates the preferred voltage of an electronic circuit. The turn-on sequencing control parameter indicates the turn-on order of each power supply. The voltage delta control parameters indicate the preferred voltage difference between the voltage ramping of two or more power supplies. The time delta control parameters indicates the preferred time difference between turn-on of two or more power supplies.

The power system controller has the ability to resolve power-on requirement conflicts. Using the specified desired power requirements, the power system controller determines the existence of any power conflicts. Before power is transmitted through the power bus, the power conflict must be resolved. Once the power system controller has ensured the absence of conflicts, it provides each power supply the necessary information to power any attached electronic circuit or module. The power supply controller communicates with the power supplies via the power control bus. If an unresolvable conflict exists, the power system controller preferably causes a message to be sent to an operator indicating the presence of an unresolved power requirement conflict.

A method for an electronic power supply system adaptively configuring the power applied to one or more electrical circuit loads is also provided. The method includes the steps of detecting the presence of electronic circuits, determining power supply requirement parameters, examining power supply requirement parameters of each electronic circuit for power conflicts, and programming power supplies to provide requested power-on requirements of each electronic circuit if no conflict exists. Another aspect of the system is the electronic modules for use in the adaptable power supply system. The module includes a module connection interface, a plurality of electronic circuit loads, a communication bus interface adapted for communicating with a power supply controller, a memory device for storing a data structure, where the data structure includes fields to store power supply requirement parameters such as at least one voltage identifier parameter, at least one module identification parameter, at least one power-on sequence parameter, at least one delta voltage parameter, at least one time delta control parameter. The memory device can be a storage register, a manually configurable DIP switch, or a random access memory having an integrated communication bus, such as an I²C bus.

The foregoing and other features and advantages of a preferred embodiment of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE PREFERRED EMBODIMENT

Figure 1:
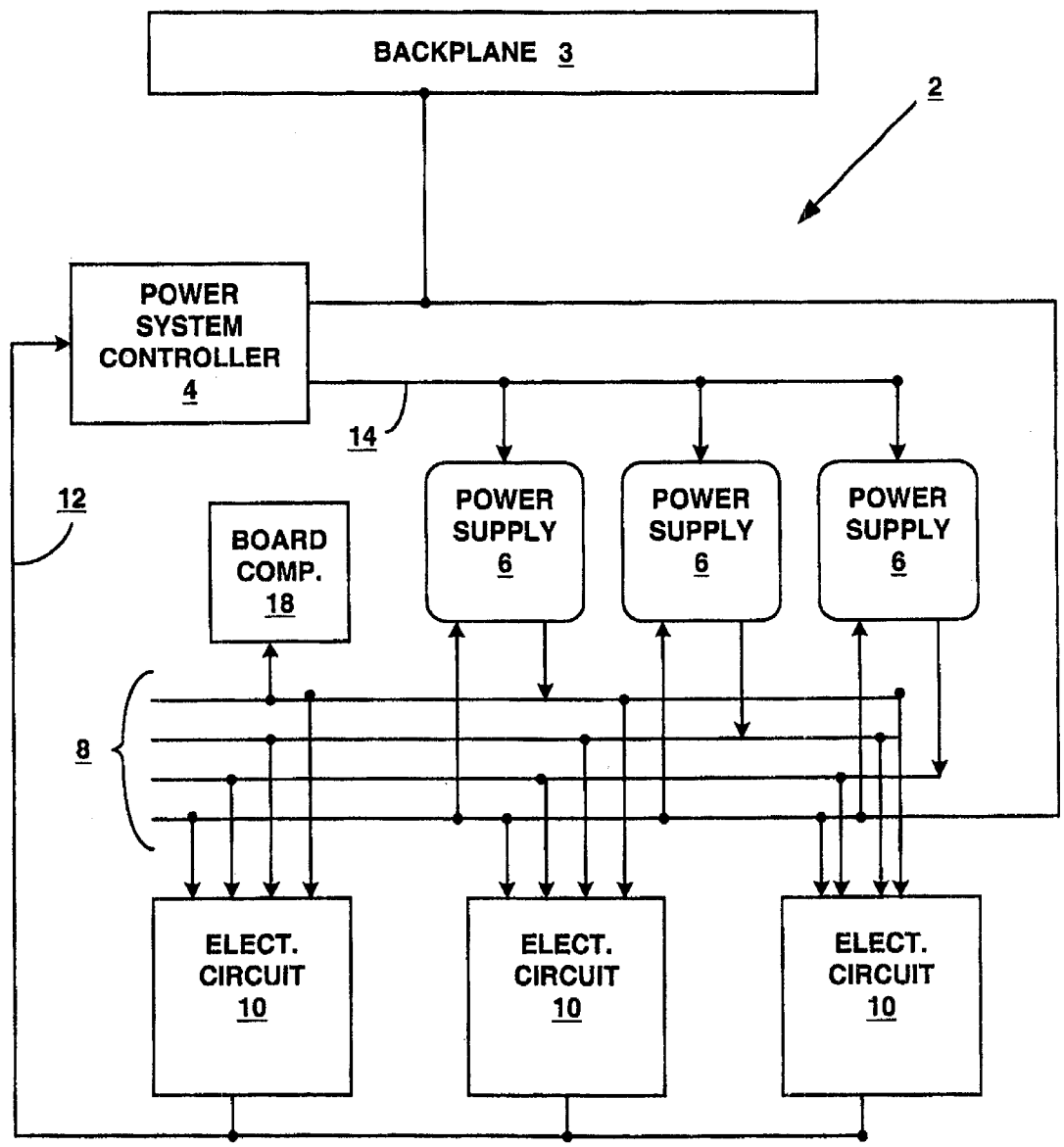
FIG. 1 is a block diagram illustrating an electronic power supply system.

As shown in FIG. 1, an electronic power supply system 2 preferably includes a power system controller 4, at least two power supplies 6, a power bus 8, a power control bus 14, a communication bus 12, and one or more electronic modules 10.

The modules 10 may actually be physically distributed throughout a device chassis, board, or device. Preferably, the modules 10 are circuit loads that reside on a common board, package or assembly, and may be a single circuit with multiple voltage requirements, or may be multiple circuits or subsystems. In a preferred embodiment the modules 10 are preferably of a plug-in type, allowing for easy substitution or replacement on the baseboard on which the power supplies 6 preferably also reside. The circuit modules 10 may have a number of different functions, designs and layouts. Some examples are communication modules such as modems (one or more V.90, V.34 or the like, modems per module), network interface modules (Ethernet, token ring, ATM, SONET, etc.), signal processing modules such as used for compression (V.42bis, MPEG, G.729, G.711, G.723), encryption (IPSEC), or High-level data link control (HDLC). Preferably, all of these modules 10 may be plugged into a commonly designed baseboard. All of the modules 10, or differing subsets of the modules 10 may be designed for compatibility for simultaneous use on a single baseboard. For simplicity, the term module as used herein refers to all such combinations of circuit loads, electronic circuits, subsystems and modules described above.

Preferably, the power supplies 6 and power system controller 4 reside on the same board with a plurality of the modules 10, but this configuration is one preferred configuration among many possible uses the programmable intelligent power supply system described herein. For example, the power supply system described herein may just as easily be used to control the voltages within a single board or device to accommodate component or module changes, or alternatively, within a system having a plurality of circuit cards, where each card may have different power requirements or where changes to the circuits or components on a card may result in changed power requirements.

As shown in FIG. 1, power is applied to power system controller 4 from a backplane 3. Typically, the backplane 3 is a device that provides power to multiple electronic devices, an example of which is an electronic board having sockets into which additional electronic devices (e.g., a baseboard) can be plugged into. A voltage from backplane 3 typically remains at a constant voltage (i.e., fixed output) with regard to ground. A system (e.g., a system powered by electronic power supply system 2) typically assumes the backplane 3 is capable of supplying enough power to the system (i.e., the board) such that the system 2 performs its function as intended.

Power system controller 4 controls one or more power supplies 6, and causes them to provide power when each of the modules 10 have compatible power requirements. The power bus 8 has multiple conductors for supplying power to modules 10 from the power supplies 6. Each power supply 6 has an output connected to at least one of the conducting lines. The number of conductors depends on the overall system requirements, and may include extra conductors for redundancy or for future expansion. As shown in FIG. 1, the power bus 8 includes four conductors.

Electronic circuit modules 10 attached to the power bus 8 have certain power-on requirements, and the power bus 8 supplies power to modules 10 in accordance with their power-on requirements. The requirements may include voltage, power sequencing, voltage ramping, power consumption, and the like. The controller 4 corresponds with each module on a communication bus 12. Information transmitted between the power system controller 4 and each module 10 provides the power system controller 4 with desired power requirements for each module 10.

The power system controller 4 communicates with each power supply 6 on a power control bus 14. Information transmitted between the power system controller 4 and each power supply 6 provides each power supply 6 data to power any attached electronic circuit 10.

Exemplary Power Supplies of the Preferred Embodiment

The power supplies 6 may take many forms, from a simple zener diode to sophisticated switching power supplies. Typically, the power supplies 6 are direct current to direct current ("dc-dc") converters, and convert the power obtained from the backplane 9 to a desired output voltage. Power supplies 6 can have a fixed output or can be programmed to supply a fixed output within a given range of voltages. All of the various power supplies 6 preferably have an enable input to control their on/off status. This may be used to control the sequence in which the power supplies are turned on. In addition, some or all of the power supplies 6 preferably have a control input 7 that is used to control the output voltage applied to power bus 8. The control input 7 may be used to control power-on sequencing, rise time (i.e., ramping) or used to maintain a preferred voltage difference between its output and another power supply 6 output.

In one preferred embodiment, a set of power supplies 6 in electronic system 2 include a power supply having a non-programmable linear converter and at least one power supply having a programmable converter. The converters typically comprise voltage-to-current and current-to-voltage converters, such as a buck and boost converter, although other converters can be used. Buck converters, sometimes referred to as a "buck regulator", a "step-down" converter, or a "forward" converter, are used in a wide range of electronic circuit applications. The output voltage is independent of the load (e.g., an electronic circuit is the load), however the output voltage is proportional to the input voltage 20 (e.g., a backplane 3 provides the input voltage).

Figure 2:
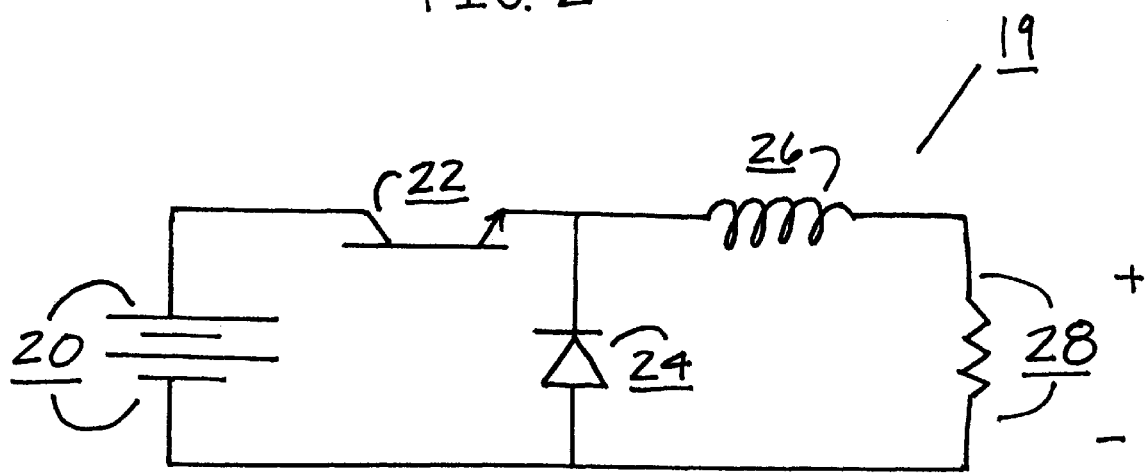
FIG. 2 is a simplified circuit model illustrating a buck converter.

A simplified model of a buck converter 19 is illustrated in FIG. 2. The simplified model contains a switching device (e.g., a MOSFET) 22, a diode 24, and an inductor 26, although more or less components can be used to condition the signal. The output voltage 28 of a buck converter 19 is controlled by the frequency of a switching device 22 (i.e., turn switch on, off . . . on). On average, the output voltage 28 is determined by a duty ratio. The duty ratio can be between 0% and 100%. Meaning at a 0% duty ratio, the output voltage 28 is zero volts and at a 100% duty ratio, the output voltage 28 is equal to the input voltage 20. Thus, the output voltage 28 is a variation of the duty ratio and the input voltage 20. A non-programmable power supply 6 has a fixed duty ratio, so the output voltage 28 is held at a fixed voltage. For example, Linear Technology has developed a buck regulator, LTC 1430 Synchronous Step-Down Regulator, that with an input voltage 20 of 5 volts can produce a fixed output voltage 28 of 3.3 volts. Other suitable DC-DC converting power supplies may be found in The Electronics Handbook, CRC Press, ed. Jerry Whitaker, 1996, pages 991–1002.

A programmable power supply 6 may contain a device that can increase and decrease the duty ratio, thereby changing the output voltage 28 of the regulator 6. Although programmable power supplies 6 follow similar principles of the buck converter, the device, components or method of the programmable regulator 6 may be different. For example, Unitrode has developed an Average Current Mode Synchronous Controller with 5-Bit DAC ("Digital to Analog Converter"). The DAC output voltage is directly related with Intel's 5-bit VID ("Voltage Identification") code that can output 1.3 volts to 2.05 volts in 50 milli-volt increments and 2.1 volts to 3.5 volts in 100 milli-volt increments. The Unitrode chip is intended to power the Pentium® II or a similar processor.

The VID supports voltage specification variations on Pentium® processors. The Unitrode DAC, for example, is programmed according to Table 1, where for a given Digital Command, the power supply output regulates at the corresponding Command Voltage.

TABLE 1

Programming the Command Voltage for the UCC3882

| Digital Command D4 D3 D2 D1 D0 | Command Voltage | Digital Command D4 D3 D2 D1 D0 | Command Voltage |
|---|---|---|---|
| 0 1 1 1 1 | 1.30 | 1 1 1 1 1 | 2.00 |
| 0 1 1 1 0 | 1.35 | 1 1 1 1 0 | 2.10 |
| 0 1 1 0 1 | 1.40 | 1 1 1 0 1 | 2.20 |
| 0 1 1 0 0 | 1.45 | 1 1 1 0 0 | 2.30 |
| 0 1 0 1 1 | 1.50 | 1 1 0 1 1 | 2.40 |
| 0 1 0 1 0 | 1.55 | 1 1 0 1 0 | 2.50 |
| 0 1 0 0 1 | 1.60 | 1 1 0 0 1 | 2.60 |
| 0 1 0 0 0 | 1.65 | 1 1 0 0 0 | 2.70 |
| 0 0 1 1 1 | 1.70 | 1 0 1 1 1 | 2.80 |
| 0 0 1 1 0 | 1.75 | 1 0 1 1 0 | 2.90 |
| 0 0 1 0 1 | 1.80 | 1 0 1 0 1 | 3.00 |
| 0 0 1 0 0 | 1.85 | 1 0 1 0 0 | 3.10 |

TABLE 1-continued

Programming the Command Voltage for the UCC3882

| Digital Command D4 D3 D2 D1 D0 | Command Voltage | Digital Command D4 D3 D2 D1 D0 | Command Voltage |
|---|---|---|---|
| 0 0 0 1 1 | 1.90 | 1 0 0 1 1 | 3.20 |
| 0 0 0 1 0 | 1.95 | 1 0 0 1 0 | 3.30 |
| 0 0 0 0 1 | 2.00 | 1 0 0 0 1 | 3.40 |
| 0 0 0 0 0 | 2.05 | 1 0 0 0 0 | 3.50 |

In one preferred embodiment of the present invention, the module 10 is a communication module that uses a plurality of power supplies 6, including a 5-volt non-programmable power supply, a 3.3 volt non-programmable power supply, two programmable power supplies, and one linear regulator-based power supply.

Exemplary Controller Signals

The control input 7 to a given power supply 6 may be a control voltage, but typically is a digital input, such as the 5-bit VID format. The particular type of control input depends largely on the particular design of the power supply 6. Typical power supplies may use zener diodes, voltage dividers, or DC-DC converters, as described above. Thus, the various power supplies 6 may include digitally-programmable potentiometers, DACs, or switching power supply controllers having integrated DACs, or the like. The system described herein is preferably under the control of power system controller 4, which may have digital as well as analog outputs to control the power supplies 6.

Figure 3:
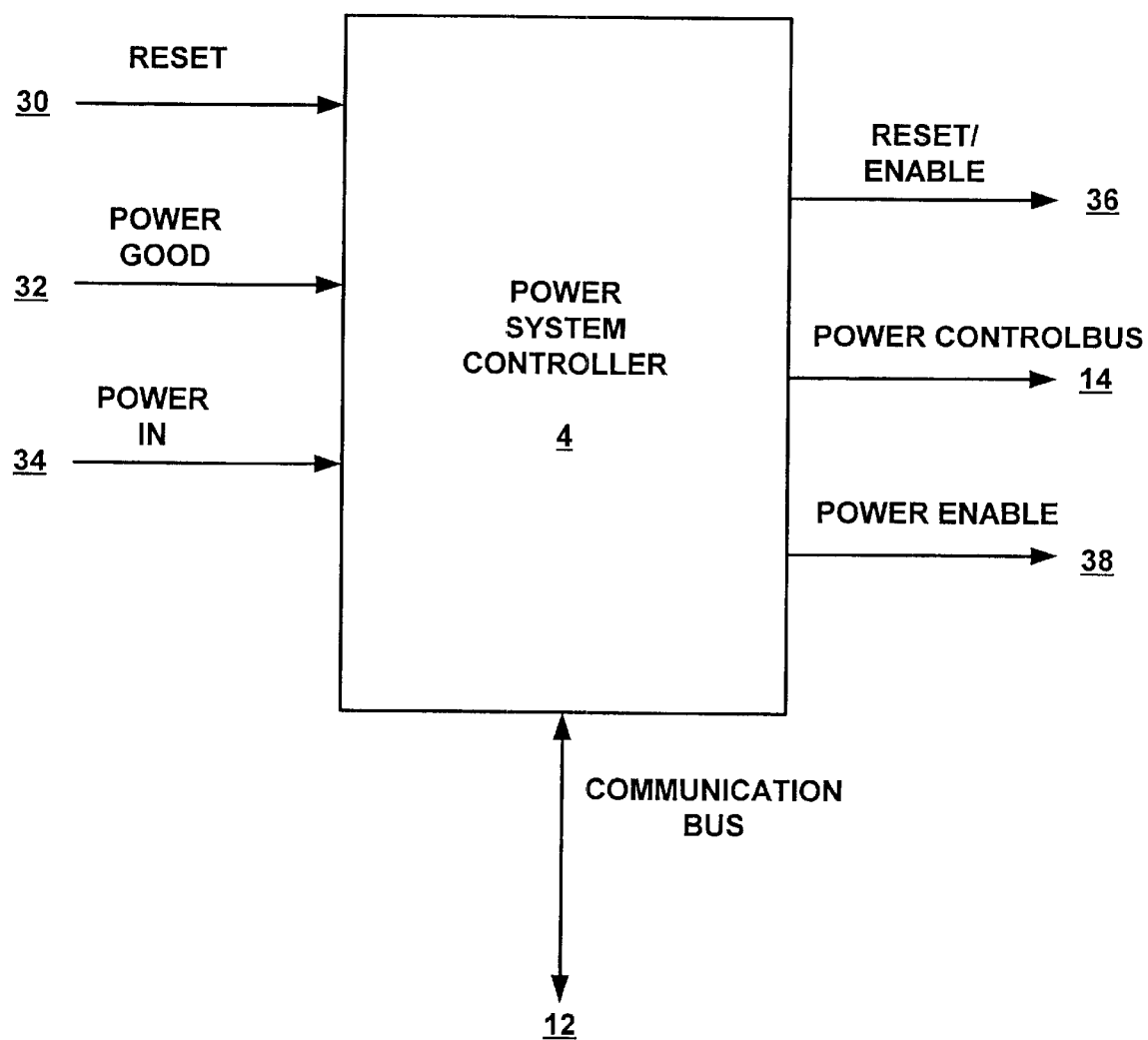
FIG. 3 is a block diagram illustrating controller signals.

In one preferred embodiment of power system controller 4 shown in FIG. 3, power system controller 4 has various input and output lines to manage the electronic power supply system. Preferably, the input and output lines are bi-directional communication bus 12 leading to modules 10, a uni-directional power control bus 14 leading to power supplies 6, an input power line 34, a reset input 30 from a soft-start circuit, a Power Good input 32 from power supplies, a power enable 38 to the power supplies, and a reset output 36 leading to the power supplies 6. Note that power enable line 38 and power good line 32 may be multiple conductors or a suitable bus architecture to accommodate the multiple power supplies 6. Alternatively, the enable control and the power good feedback may be provided over communication bus 12. Preferably, however, dedicated lines are utilized to avoid the circuitry overhead associated with communication bus 12 access.

The bi-directional communication bus 12 is preferably a set of conducting lines providing information such as module 10 identification and/or power requirements to the power system controller 4. However, the present invention is not limited to a communication bus 12 comprised of a set of conducting lines, but rather any communication and/or data bus 12 that can pass necessary information, as is described in subsequent sections, between the power system controller 4 and the electronic circuit/module 10.

The power control bus 14 provides power-on information to the power supplies 6, such as an indication of voltage level for each power supply 6 and turn-on sequence corresponding to each power supply 6. The power control bus 14 comprises a set conducting lines. The present invention is not limited to a power control bus 14 comprised of a set of conducting lines, but rather any suitable data bus 14 that can transmit the necessary information, as is described herein, between the power system controller 4 and the power supplies 6. Indeed, the power control bus 14 and the communication bus 12 may be implemented as a single bus. The power input 34, typically from a backplane 3, provides power to the power system controller 4. In an alternative embodiment, the programmable power supplies 6 may be set manually through the use of DIP (Dual Inline Package) switches or by hardwiring. The power system controller 4 is then also manually updated with the present power supply 6 configuration information (via software/firmware modification, or setting similar DIP switches connected to the power supply controller 4). In this manner, the electronic power control system 2 may still utilize other aspects of the invention such as module 10 identification, power requirement conflict checking, power-on sequencing (via enable lines 38), power good monitoring and fault reporting, etc.

The reset input 30, typically from a soft-start controller such as the LTC®1422 Hot Swap™ controller generates a system reset when the supply voltage (e.g., backplane voltage) falls below a programmable voltage. The Power Good input 32 from a power supply 6 transmits to the power system controller 4 an input logic signal, thereby making the power system controller 4 aware that the power supply 6 output has risen above or fallen below the desired output voltage. The reset output 36, from the power system controller 4 to the power supply 6, allows the power system controller 4 to reset each power supply 6.

Exemplary Power System Controller

In a preferred embodiment, the power system controller 4 is a microprocessor. The microprocessor is preferably supported by a read-only memory ("ROM") device and/or RAM containing software code to implement to the control system features. The software may be supplied and/or upgraded by various means, including by ROM or other computer-readable storage medium containing program instructions, or by on-line software downloads if the device utilizing power system 2 is equipped with suitable communication channels and a protocol stack such as SNMP over IP. The file may also be transferred using FTP or TFTP, which may also be encapsulated in TCP, UDP, or the like.

The power system controller 4 may also be implemented in hardware via programmable logic device ("PLD"), Field Programmable Gate Array (FPGA) and/or logic gate(s) and sequential logic circuits that manage the electronic power supply system 2. In general, the power system controller 4 preferably ensures the modules 10 operate in a safe and proper fashion, and may include one or more functions such as module 10 presence detection, module 10 identification, power supply 6 voltage programming, power supply 6 power sequencing, power supply 6 voltage ramp control, module 10 power requirement conflict resolution and power supply 6 reset control.

In one preferred embodiment of the present invention, the power system controller 4 performs detection of modules 10. Module 10 detection is preferably detected through communications bus 12. Thus communications bus 12 may be an Inter Integrated Circuit bus ("I²C" bus) 12. The I²C bus format was created by Philips Semiconductors and consists of 2 active wires and a ground connection. The active wires, Serial Data line ("SDA") and Serial Clock line ("SCL"), are both bi-directional. Each component (e.g., electronic circuit 10) connected to the communication bus 12 has a unique address. Furthermore there may be one or more BUS MASTER. The BUS MASTER is a chip issuing commands on the power control bus 12. The I²C protocol specification states that the device (e.g., power system controller 4) initiating a data transfer on the power control bus 12 is considered the BUS MASTER. Meanwhile, all the other devices (e.g., modules 10) are considered SLAVE's. The I²C communication bus 12 is a Multi-MASTER BUS, meaning more than one device that is capable of initiating data transfer can be connected to the communication bus 12. Pull-down resistors are placed on the I²C communication bus 12 lines. If the electronic circuit 10 is not present, the I²C bus 12 state is logic 0, and the controller 4 recognizes that a module 10 is not present. However, if the module 10 is present, the I²C bus 12 is pulled up, and the I²C bus state 12 is logic 1, indicating module 10 presence.

In one preferred embodiment of the present invention, power system controller 4 determines the power supply requirement parameters by first obtaining one or more module identification parameters from the modules 10. The controller 4 may then look up the corresponding power supply requirement parameters in a lookup table located on a ROM, for example, or in system RAM. Alternatively, the power system controller 4 may retrieve power supply requirement parameters for each attached electronic circuit or module 10 using communications bus 12, such as an I²C bus discussed above. Power supply requirements provide the power system controller 4 with power-on requirements of each electronic circuit or module 10 attached to power bus 8. Thus, power supply requirement parameters may be determined from the module identification parameter corresponding to each attached module 10 or may be provided directly by the modules 10.

In a preferred embodiment of the present invention, a controller 4 obtains power-on requirements corresponding to each attached electronic circuit 10. The power-on requirements provide the controller 4 with enough information to power the electronic circuit 10, such as a module identification number, voltage control parameter, turn-on sequencing control parameter, voltage delta control parameter, and a time delta control parameter.

In a preferred embodiment of the present invention, a voltage control parameter indicates the preferred rail voltage (i.e., max voltage requested by a module 10) of a electronic circuit 10 per conducting line within a bus 8.

In a preferred embodiment of the present invention, a time delta control parameter indicates the preferred time difference between turn-on of at least two power supplies 6. That is, a first power supply 6 turns on, then a second power supply 6 may have to wait to turn on for a period of time given by the time delta control parameter. For example, an electronic module that utilizes four separate voltages, v1, v2, v3, and v4, may require power from v3, then from v1, from v2, and finally from v4. Thus, the turn on order for that particular electronic module is the power supplies 6 corresponding to (v3), (v1), (v2), (v4). The sequencing parameters are used to specify the particular turn-on sequencing. The required sequencing may be achieved by use of enable outputs 38 of power system controller 4, or by providing VID information to power supplies 6 in the desired sequence over power control bus 14.

Figure 4:
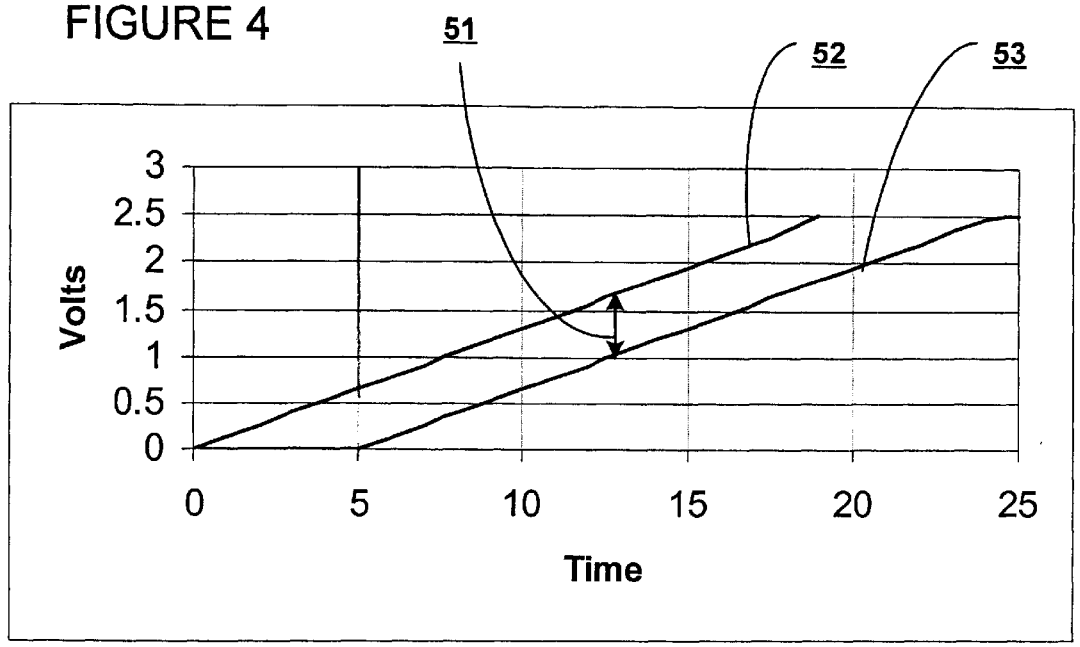
FIG. 4 is a voltage plot illustrating an exemplary use of a voltage delta control parameter.

In a further preferred embodiment of the present invention, voltage delta control parameters indicate the preferred voltage difference between at least two electronic circuits or modules 10. For example, if one module 10 requires four separate voltages, V1, V2, V3, and V4, it may also specify that V1 and V3 are to ramp up to a predetermined rail voltage with a constant voltage differential between them (V1 and V3 rail voltage are equal in this example for simplicity). Either by additional specific parameters or by the lack thereof, the module 10 indicates that it does not matter how V3 and V4 are applied. Referring to FIG. 4, the voltages V1 (50) and V3 (52) as seen by the circuit load, maintain a differential voltage of 0.7 volts (51), assuming the regulator increments the voltage in 0.13 volts.

The control of the delta voltage is accomplished by stepping the VID values to the appropriate power supplies 6 over the power control bus 14 in an appropriate manner.

Figure 5:
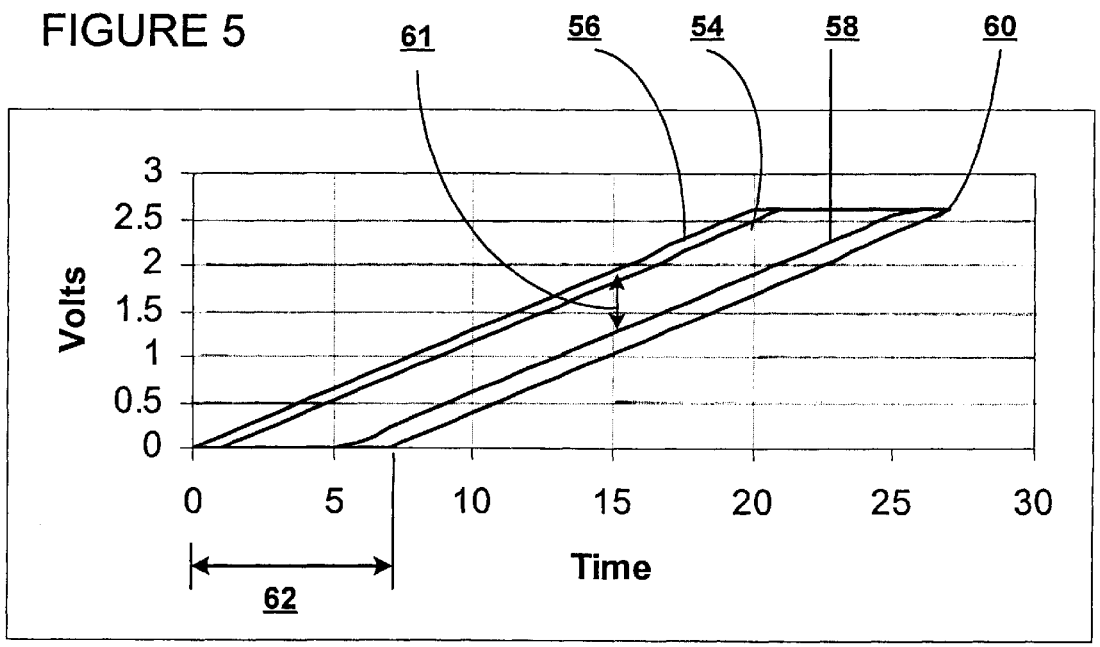
FIG. 5 is a voltage plot illustrating an exemplary use of power-on requirements.

In an alternate embodiment of the present invention all power-on requirements, such as a voltage control parameter, turn-on sequencing control parameter, voltage delta control parameter, and a time delta control parameter are used together. For instance, module 10, by way of its parameters (obtained directly form the module 10 or by way of lookup), may require four voltages V1, V2, V3, and V4, a turn-on order of V2, V1, V3 and V4, and further require that V2 and V3 must maintain a 0.3 volt differential and that V4 must wait seven seconds to turn on after V2 turns on. FIG. 5 is a plot of the four voltages V1 (54), V2 (56), V3 (58), and V4 (60) as seen by the module 10. Note that the rail voltages are all equal for simplicity. FIG. 5B demonstrates the 0.3 volt differential (61) between V2 (56) and V3 (58) and a 7 second time differential (62) between V4 (60) and V2 (56). Clearly, this is but one example, and other combinations of power requirements can exist.

In a further preferred embodiment of the electronic power supply system, power system controller 4 resolves power-on requirement conflicts. Using information from the electronic circuits 10, such as power supply requirement parameters, the power controller 4 checks to see if conflicts exist. The power system controller 4 determines conflict resolution by comparing the power supply requirement parameters of each module 10 attached to power bus 8. Before power is transmitted through power bus 8, the power conflict must be resolved.

Power supply requirement parameters comprise a voltage control parameter, turn-on sequencing control parameter, voltage delta control parameter, and a time delta control parameter. These parameters or a subset thereof are examined to determine compatibility of the modules 10. As an exemple, module 10 A, referred to herein for clarity as "MA", and module 10 B ("MB") are attached to power bus 8. Power system controller 4 obtains the power supply requirements from each of MA and MB. The power system controller 4 proceeds to determine if a power conflict exists by comparing relating requirements from both MA and MB. In this example, MA requests 3 separate voltages and MB requests 4 separate voltages, and three of the MB voltage requirements (e.g., voltage control parameter, turn-on sequencing, voltage delta control parameter, and time delta control parameter) are equal to that of MA. Furthermore, MA has a "don't care" for the fourth voltage line, meaning it will not use the fourth voltage. The power system controller 4 does not find a conflict and can proceed to power up the modules. In the event that MB voltage requirements do not equal MA voltage requirements, the controller would not proceed to power up the modules 10.

In an alternative embodiment of the system 2, power system controller 4 resolves power-on requirement conflicts. Before power is transmitted through power bus 8, the power conflict must be resolved. Using information from the electronic circuit 10, such as power supply requirement parameters, the power system controller 4 first determines power conflicts. In this embodiment, the modules 10 may specify a range for the required voltage rails. This may be due to the ability of the particular components to utilize a range of voltages, or because the module 10 has a further voltage converter available to modify the voltage supplied by a particular power supply 6. In the case where one module 10 specifies a voltage range, say V1–V2, on a particular line of power bus 8 and another module 10 specifies a specific voltage, say V3, where V3 is within the V1–V2 range on the same line, a potential conflict will be resolved by programming the particular power supply to supply voltage V3. Of course, if voltage V3 is outside the range of V1–V2, then an un-resolvable conflict is present, and power system controller 4 reports an error condition. This is preferably done via the baseboard components 18 which include overall board management functions. Specifically, this preferably includes an SNMP agent or similar communication service that communicates to a network manager.

In a further embodiment where the power supplies 6 are hardwired and power system controller 4 is informed of the configuration as described above, the module 10 identification (ID) must be the same for each module 10, and must match the configuration of the power supplies 6 as specified by a predetermined power supply configuration parameter. In this embodiment, the power system controller is unable to resolve any conflicts and simply generates an error message as described above.

An Exemplary Communication System of the Preferred Embodiment

Figure 6:
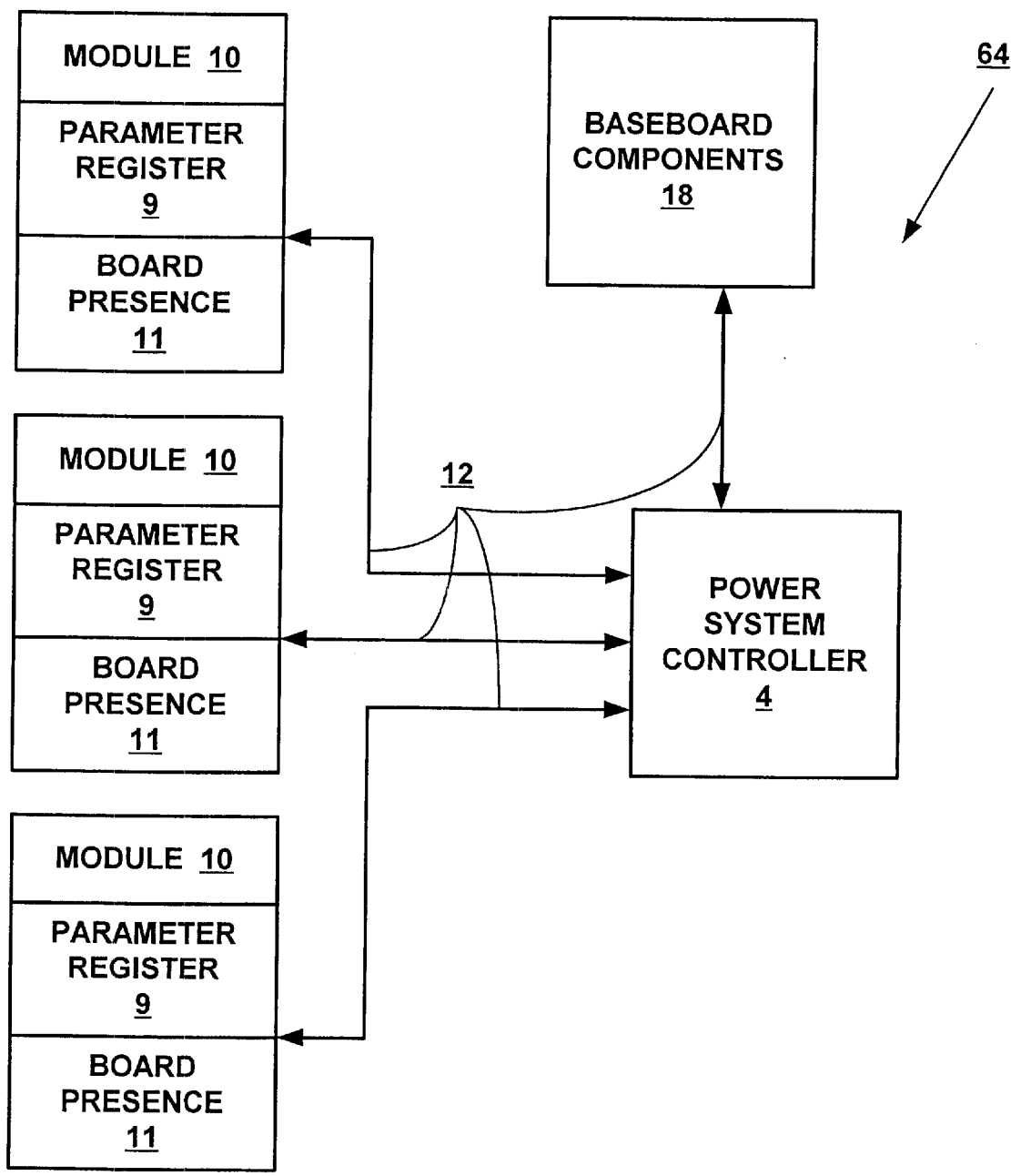
FIG. 6 is a block diagram illustrating an exemplary communication system.

FIG. 6 refers to a block diagram illustrating an exemplary communication system 64 of the preferred embodiment comprising a power system controller 4, modules 10, a parameter register 66, a board presence detection circuitry 68, and a communication bus 12. Data is transmitted between the modules 10 and power system controller 4, across the communication bus 12. The transmitted data comprises power supply requirement parameters and board presence detection signal.

In one embodiment of the preferred invention, each module 10 possesses information regarding power supply requirements. Thus, each electronic circuit 10 possesses at least one parameter register 66. The register 66 can store the power supply requirement parameter(s) statically, dynamically and/or hard wired (e.g., using a combination of passive and/or active devices). FIG. 6 illustrates a block diagram with a module 10 including one power supply requirement parameter register 66. It is therefore preferred that plugable modules 10 contain a register or other suitable memory device such as an I$^2$C compatible RAM that is able to store a suitable data structure have module identification and/or power requirement parameters.

Attached to each module 10 is a communication bus 12. In one embodiment of the preferred invention, the communication bus 12 is an I$^2$C bus 12. The I$^2$C bus 12 allows for transaction of information between the module 10 and power system controller 4. The communication bus 12 transmits information such as one or more power supply requirement parameters.

In an exemplary embodiment of the present invention, a module number or module ID, shown in Table 2 provides information used to identify the currently installed module and the power supply requirement parameters, within an electronic power supply system 2 having two programmable regulators 6 and two non-programmable regulators 6.

TABLE 2

| Exemplary format of a module number | | | | | | | | |
|---|---|---|---|---|---|---|---|---|
| MSB | | | | | | | | LSB |
| Mod ID | VID1 | VID2 | PRO | PS | VM1 T1 | T1U | VM2 T2 | T2U |
| 8-bit | 5-bit | 5-bit | 3-bit | 1-bit | 7-bit | 1-bit | 7-bit | 1-bit |

Mod ID is a logic number (e.g., 8-bit word in Table 2) that serves as a module identification for each module 10. This number can be used to identify a specific module and/or to identify board presence. VID1 & VID2 are 5-bit words representing rail voltages for two programmable power supplies. The format for VID correlate to the VRM standard as shown in Table 1. PRO is a 3-bit word representing the turn-on sequencing control parameter. A 3-bit word provides enough information to provide turn-on sequencing for four power supplies. Table 3 decodes the turn-on sequencing control parameter relating to the four available power supplies 6.

TABLE 3

| PRO | | | SEQUENCING OF POWER SUPPLIES | | |
|---|---|---|---|---|---|
| MSB | | LSB | PS 1 | PS 2 | PS 3 |
| 0 | 0 | 0 | 0 | 0 | 0 |
| 0 | 0 | 1 | 3 | 2 | 1 |
| 0 | 1 | 0 | 1 | 3 | 2 |
| 0 | 1 | 1 | 3 | 1 | 2 |
| 1 | 0 | 0 | 1 | 2 | 3 |
| 1 | 0 | 1 | 2 | 1 | 3 |
| 1 | 1 | 0 | 2 | 3 | 1 |
| 1 | 1 | 1 | 0 | 0 | 0 |

PS is a 1-bit word representing the power up scheme. When set (i.e., logic 1) the controller 4 will use T1U and T2U as a time delta control parameter. If clear (i.e., logic 0), then the controller 4 will use VM1 and VM2 as voltage deltas between power rails. VM1 represents the allowable voltage delta between ramp order 1 and 2 (e.g., power supply 1 and power supply 2). VM2 represents the allowable voltage delta between ramp order 2 and 3 (e.g., power supply 2 and power supply 3).

T1 and T2 are each a 7-bit number representing a time to wait between enabling power supplies. T1 represents the time between ramp 1 and ramp 2 (e.g., power supply 1 and power supply 2). T2 represents the time between ramp 2 and ramp 3 (e.g., power supply 2 and power supply 3). T1U and T2U represent the units of T1 and T2, such as if T1U is logic 1 then T1 has units in milli-seconds and T1U is logic 0 then T1 has units in nano-seconds.

Power Control Bus of the Present Invention

Figure 7:
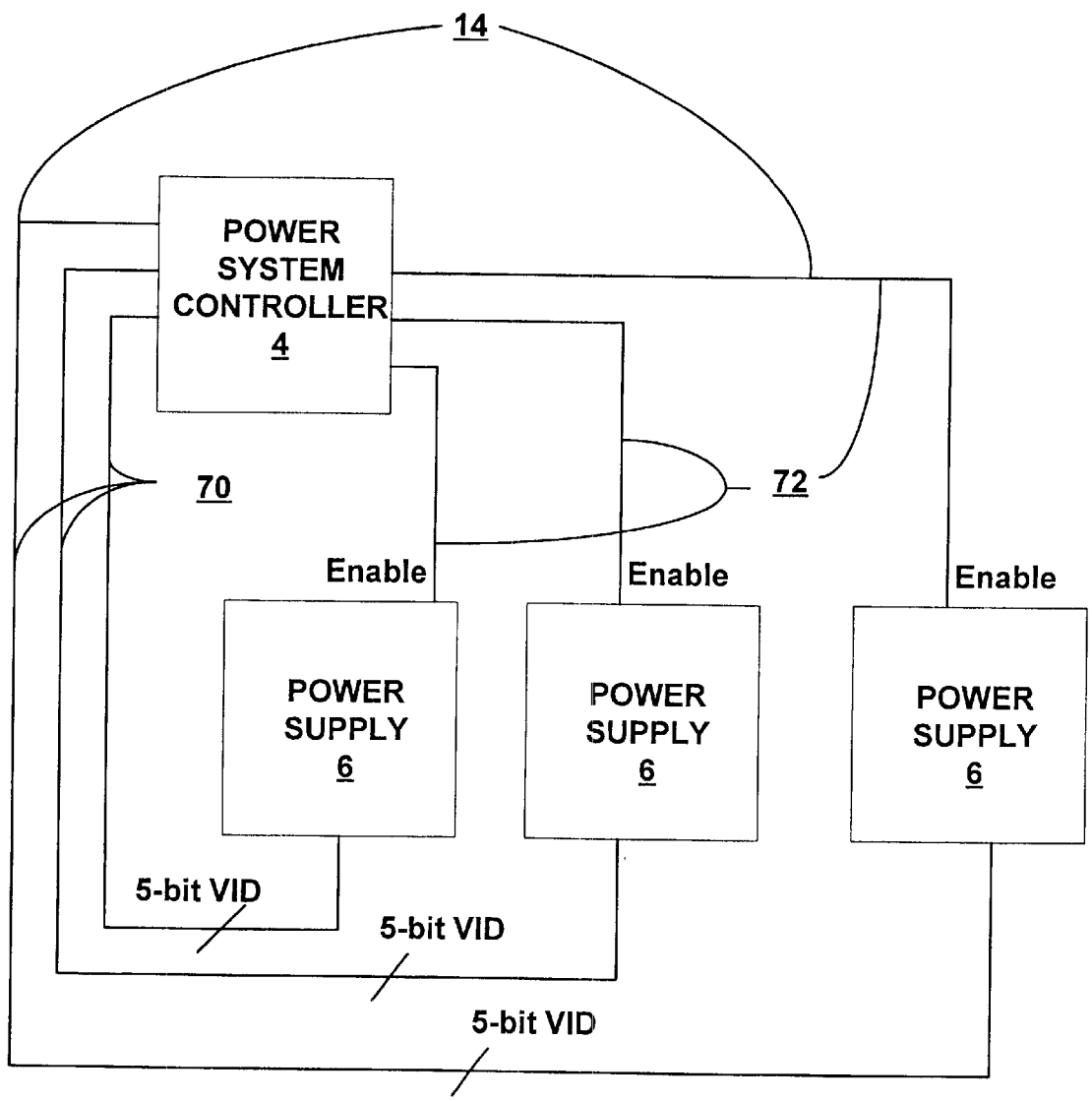
FIG. 7 is a block diagram illustrating an exemplary power control bus.

FIG. 7 represents a block diagram illustrating the power control bus 14 in connection from the controller 4 to the regulators 10. In the preferred embodiment, the power control bus 14 comprises conducting lines. Each mod line 70 transmits a 5-bit module number. The parameter register 66 obtains power from a 5-volt bus, where the parameter register provides the controller 4 a module number using I²C protocol.

After startup, the backplane 3 provides power to the parameter register 66 corresponding to each module 10. The power system controller 4 determines the power requirements of a module 10 through the I²C communication bus 12. The power system controller 4 transmits a 5-bit module number corresponding to the module 10 power requirements to each power supply 6.

Before each power supply 6 can supply power to power bus 8, the power system controller 4 sends an enable signal on an enable line (i.e., any suitable electrical conduction line) 72 to each supply. Note that the enable lines may be incorporated into power control bus 14. When a power supply 6 receives an enable signal from the power system controller 4, power is applied to the power bus 8.

Power Subsystem of the Present Invention

Figure 8:
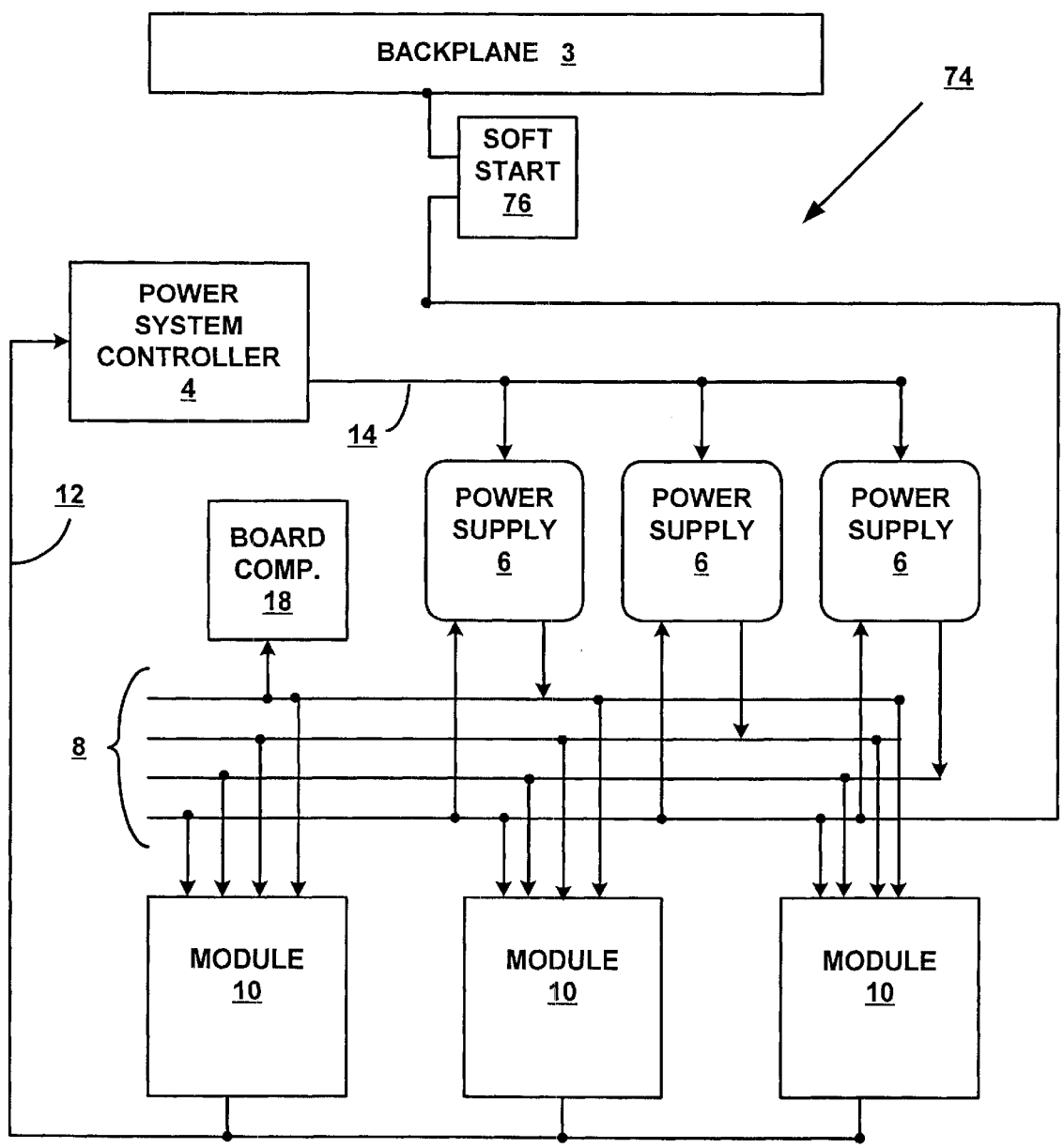
FIG. 8 is a block diagram illustrating an exemplary power subsystem.

FIG. 8 is a block diagram illustrating an exemplary power subsystem 74 of the prefersred embodiment comprising a backplane 3, a soft-start circuit 76, power system controller 4, and power supply 6. The main power is provided by a 5-volt backplane 3 to a soft-start circuit 76, such as the LTC®1422 Hot Swap™ controller from Linear Technology. The LTC®1422 is an 8-pin, Hot Swap™ controller that allows a board to be safely inserted and removed from a live backplane 3. The board supply voltage can be ramped up at a programmable rate. Supply voltages range from 2.7V to 12V. A programmable electronic circuit breaker protects against shorts. The RESET output can be used to generate a system reset when the supply voltage falls below a programmable voltage. The ON pin can be used to cycle the board power or to generate a soft reset.

Power from the soft start circuit 76 provides power to the power system controller 4, power requirement parameter 66, board detection 68, linear regulator 16, and the regulators 6. The power supplies 6, however, cannot provide power to modules 10 until enabled by the power system controller 4. The power system controller 4 handles all enables and reset control for each power supply 6. Once the power supplies 6 are enabled (i.e., after any power conflicts are resolved), power is applied to power bus 8 and baseboard components 18. The controller sets the order in which the 3.3-volt power supply 6 and the two programmable power supplies 6 turn on. The modules 10 are powered by a 5-volt backplane 3, the 3.3-volt supply 6 and two programmable power supplies 6. The baseboard components 18 are powered from the 3.3-volt common supply 6 and the linear regulator 16.

Power Budget

Each electronic circuit or module 10 and the baseboard components 18 have a power budget that must be maintained to protect the circuitry from potential current leakage and damage. The power rail budget is applied from each power supply 6 as well as an overall power budget. The overall power budget is present in order to make sure the thermal design specifications of the system 2 are met. Power rail budgets are present in order to ensure that the regulators 6 are not overdriven.

The overall power usage must be investigated to ensure that the total power can be dissipated within the chassis, and the backplane 3 is capable of delivering enough power to the board. The communication module 10 design must be evaluated to ensure that any of the power supplies are not overdriven. The baseboard power must also be examined for power usage.

A Method for Adaptively Configuring Power Applied to an Electronic Circuit

In one preferred embodiment of the present invention, a method for an electronic power supply system adaptively configuring the power applied to one or more modules 10 comprise the steps of detecting modules 10, determining power supply requirement parameters, examining power supply requirement parameters of each module 10 for power conflicts, programming power supplies 6 to provide power in accordance with requested power-on requirements.

In one preferred method of the present invention, the power system controller 4 detects electronic circuit 10 through an I²C communication bus 12. Pull-down resistors are placed on the I²C bus 12 lines. If the electronic circuit 10 is not present, the I²C bus 12 state is logic 0, and the controller recognizes an electric circuit is not present. If the module is present the I²C bus 12 is be pulled up, thus the I²C bus 12 state is logic 1, distinguishing electronic circuit presence.

In an alternate method of the present invention, the communication module detects electronic circuit 10 presence through an I²C communication bus 12. Using an I²C bus 12 and I²C protocol, a power system controller 4 communicates with a module 10. The power system controller 4 queries the module 10 wherein, if the module 10 does not reply, the power system controller 4 interprets the lack of response as the absence of module 10. If the module 10 does reply, the power system controller 4 detects the presence of module 10.

In an alternate method of the present invention, the power system controller 4 detects module 10 using an I²C bus 12. Using an I²C bus 12 and I²C protocol, a controller 4 communicates with a module 10. When the module 10 is attached, the module 10 broadcasts a message on the communication bus 12 wherein the power system controller 4 receives the broadcast realizing the module 10 is present.

In one preferred method of the present invention, power system controller 4 determines power supply requirement parameters through a communication bus 12. The power supply requirements provides the power system controller 4 with power-on requirements corresponding to each attached communication module 10. The power-on requirements provide the power system controller 4 with enough information to configure the power supplies 6, such as a voltage control parameter, turn-on sequencing control parameter, voltage delta control parameter, and a time delta control parameter.

In an alternate method, power system controller 4 determines power supply requirements. Each module 10 provides the power system controller 4 with a module identification number. The power system controller 4 determines power supply requirements using a module identification number and a storage device (e.g., memory device) containing a table of power-on requirements relating to module identification numbers.

We claim:

1. An electronic module for use in an adaptable power supply system, said module comprising:
   a module connection interface for receiving power supply source voltages;
   a plurality of electronic circuit loads;
   a communication bus interface adapted for communicating with a power supply controller;
   a memory device for storing a data structure, said data structure comprising fields to store power supply requirement parameters;
   wherein said power supply parameters are provided to said communication bus interface for adaptively configuring power supply source voltages.

2. The electronic module of claim 1, wherein said data structure comprises fields to store at least one voltage identifier parameter.

3. The electronic module of claim 1, wherein said data structure comprises fields to store at least one module identification parameter.

4. The electronic module of claim 1, wherein said data structure comprises fields to store at least one power-on sequence parameter.

5. The electronic module of claim 1, wherein said data structure comprises fields to store at least one delta voltage parameter.

6. The electronic module of claim 1, wherein said data structure comprises fields to store at least one time delta control parameter.

7. The electronic module of claim 1, wherein said memory device is a storage register.

8. The electronic module of claim 1, wherein said communication bus interface is integral to said memory device.

9. The electronic module of claim 8, wherein said communication bus interface is an I²C bus interface.

10. The electronic module of claim 1, wherein said memory device is a manually configurable DIP switch.

11. A method for using power requirement parameters of an electronic module within an adaptable power supply system, said method comprising the steps of:
    utilizing a communication bus interface for communicating with a power supply controller;
    storing a power supply requirement parameter of said electronic module; and
    providing said stored power supply requirement parameter to said communication bus interface so that said power supply controller adaptively configures a source voltage of a power supply.

12. The method of claim 11 further comprising the step of applying said source voltage to a power bus.

13. The method of claim 11 further comprising the step of storing said power supply requirement parameter in a storage register.

14. The method of claim 11 further comprising the step of storing said power supply requirement parameter in a manually configurable DIP switch.

15. The method of claim 11 further comprising the step of storing said power supply requirement parameter in a random access memory having an integrated communication bus.

16. The method of claim 15 wherein said integrated communication bus is an I²C bus.

17. The method of claim 11 further comprising the step of enabling said power supply after resolving a power conflict.

18. The method of claim 11 further comprising the step of monitoring a power supply signal from said power supply.

19. The method of claim 11 further comprising the step of providing said stored power supply requirement parameter to said communication bus interface after obtaining a module identification parameter from said electronic module.

20. The method of claim 11 further comprising the step of providing said power supply with a control input, said control input used to control said source voltage.

\* \* \* \* \*